Sept. 8, 1953  G. P. BURNS  2,651,202
THERMOMETER
Filed April 3, 1950
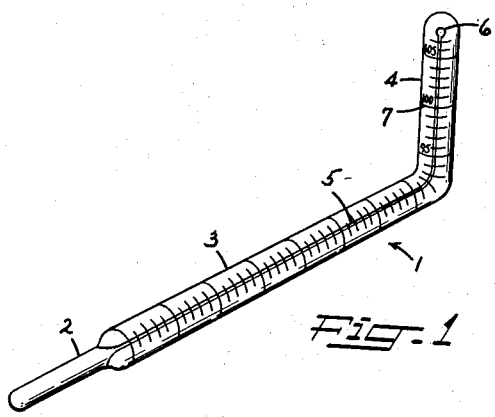
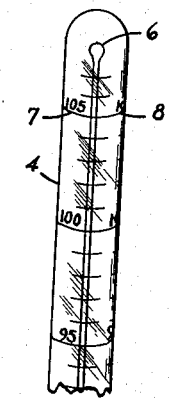
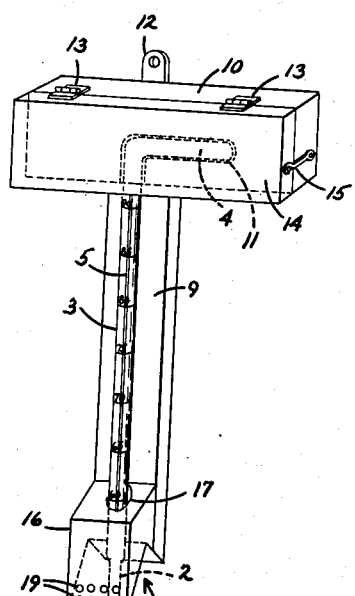
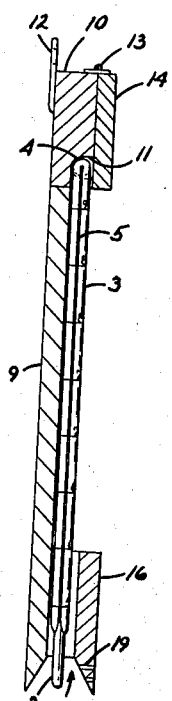
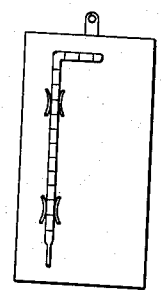
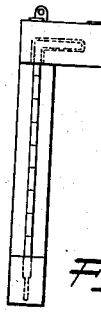
INVENTOR.
GROVER P. BURNS
BY
ATTORNEY.

Patented Sept. 8, 1953

2,651,202

UNITED STATES PATENT OFFICE 2,651,202

THERMOMETER

Grover P. Burns, Fredericksburg, Va.

Application April 3, 1950, Serial No. 153,563

8 Claims. (Cl. 73—371)

The present invention relates to a thermometer. More particularly the invention relates to a new and useful thermometer which is a combination household and clinical thermometer.

Thermometers for use in the home or for measuring room temperatures are well known and produced in various sizes and shapes. These thermometers are usually of the liquid type. That is, they contain at one end thereof a reservoir of a liquid, such as mercury, alcohol, and the like, which rises or flows into an evacuated capillary bore upon expansion due to rise in temperature and flows out of said capillary upon contraction due to a drop in temperature.

Clinical thermometers are also of the liquid type but due to their specific use have a somewhat different construction. Since the thermometer must be removed from the patient's mouth to be read it must be of the holding type, i. e., the mercury, or other liquid, must remain in the position in the capillary bore it attained while in the patient's mouth. This is accomplished by employing a fine capillary bore having a constriction therein, through which the mercury must pass upon a rise in temperature and through which the same cannot return by gravity alone. This has the disadvantage that the liquid must be shaken down from the capillary before another reading can be taken which must be done by hand or with mechanical means, various types of which are known in the art. Further, the known clinical thermometers are extremely hard to read due to the fine capillary bore and a magnifying material of some sort must be employed in their construction to enable one to see the liquid in the capillary tube or bore.

With the known and presently used clinical thermometers the patient cannot read the same while it is in his mouth. Also, due to difference in construction and accuracy of household and clinical thermometers, a thermometer for combined household and clinical use has not been thought to be practical.

Therefore it is an object of the present invention to provide a combination household and clinical thermometer of the liquid type.

Another object of the present invention is to provide a combination household and clinical thermometer which can be read by the patient while the same is in his mouth.

Another object of the invention is to provide a combination household and clinical thermometer which can be easily read and which requires no shaking down of the liquid contained therein after a reading has been taken.

Other objects and advantages of the present invention will be obvious from the description thereof hereinafter.

In conjunction with the following description of the invention reference should be had to the accompanying drawing, which is merely intended to be illustrative, and in which Figure 1 is a perspective view of the combination household and clinical thermometer, Figure 2 is an enlarged view of the short or clinical portion of the thermometer showing the arrangement of the scale thereon, Figure 3 is a perspective view of the thermometer in a preferred type of support, Figure 4 is a side elevation view of the embodiment shown in Figure 3, Figure 5 is an elevation view of another type support, and Figure 6 is an elevation view of still another type thermometer support.

The objects of the present invention are accomplished by providing a thermometer 1, as shown in Figure 1, in which 2 is the glass bulb or reservoir containing the liquid, such as mercury, alcohol, or the like. The glass bulb is integrally attached at one end of the longer portion 3 of the glass rod or thermometer 1. At the other end of portion 3 there is integrally attached at right angles thereto a shorter portion 4. Thus from the bulb 2 to the tip of portion 4 the glass rod is continuous.

While in the embodiment shown the angle between the long portion 3 and the short portion 4 is one of 90°, this angle may be increased as high as 135°. In fact, when the thermometer is placed under the patient's tongue it extends slightly upward and therefore an angle of 135° between the above named portions would be preferable.

In the center of the rod and coincident with the axis of the same is an evacuated capillary bore or opening 5 which opens into the glass bulb or reservoir 2 and terminates in the chamber 6 in the short portion 4 of the rod 1.

When the thermometer 1 is held in the mouth the portion 4 of the same extends upwardly and is at such a distance that the same is easily read with the naked eye. The long portion 3 should be more than 7 inches in length and preferably is 9 inches in length. The short or upright portion 4 may vary in length from 1 to 4 inches but is preferably 3 inches in length in order to obtain the desired sensitivity.

The long portion 3 comprises the household thermometer and the short portion 4 the clinical thermometer. The temperature scale is placed on the outside of the glass rod in the usual manner, the long portion 3 carrying the scale up to 90° F. and the short portion 4 the scale up to 105° F. The temperature range on each portion may vary somewhat however. The temperature scale may go up as high as 80 to 95° F. on the long portion 3 with the remainder of the scale being on the bend and shorter portion up to 105 or 108° F.

One embodiment of the invention which is satisfactory is a combination thermometer with a long portion 9 inches in length having a scale thereon ranging from 55 to 90° F. and a short portion 3 inches in length having a scale thereon ranging from 95 to 105° F., the range between 90 and 95° F. constituting the bend in the combination thermometer. In this embodiment 1 inch on the scale is equal to 5° F. which is a scale similar to that of the conventional and presently employed clinical thermometers and having the same sensitivity. The scale may be marked along its entire length in fifths of a degree Fahrenheit if desired, although such accuracy is only required on the clinical portion.

Another embodiment of the invention which has also proved satisfactory is a combination thermometer with a long portion 9 inches in length having a scale thereon ranging from 0 to 85° F. and a short portion 2 inches in length having a scale thereon ranging from 90 to 105° F., the range between 85 and 90° F. falling on the bend in the combination thermometer.

Both of the described embodiments have proved satisfactory when the angle between the long and short portions is 135° and also when it is 120°. In both embodiments the short or clinical portion may be lengthened slightly to provide for a scale up to 108° F.

Referring to Figure 2, which is an enlarged view of the short or clinical portion of the combination thermometer, there is shown the scale as the same is etched thereon. One scale 7 is placed on the thermometer in such a position that the same may be read by the person in whose mouth the thermometer is placed. Another scale 8, the same as 7, is placed on the thermometer 90° away from scale 7 so that the thermometer may also be read by someone other than the person in whose mouth the thermometer is placed when the same is desired or necessary. Each of the scales 7 and 8 may have opaque or milky glass back of them so that the same may be more easily read.

Referring to Figures 3 and 4 there is shown a preferred type of support for the combination thermometer. The support may be made of any rigid material such as wood, plastic, or the like, which is of low thermal conductivity. The support comprises a flat vertical section 9 which is integrally attached at its upper end to a transverse section or piece 10. In section 10 extending from the center to one end thereof is a groove 11 which extends downwardly at the center of the section 10, thus in reality being L-shaped. Attached to the back of section 10 is a hook 12 by which the support may be hung on the wall or elsewhere. Pivotally attached to the front of section 10 by means of hinges 13 is a flat piece or cover element 14 which serves to cover the L-shaped groove 11 and helps keep the combination thermometer in place. Section 14 is kept in a closed position by means of the hook 15 which is pivotally attached to section 10 on one thereof, there being a similar hook positioned on the other Attached to the lower end of the vertical section 9 is a block or base 16 having an elliptical or circular opening 17 through the center thereof. The portion 3 of the thermometer passes through the opening 17, the block 16 serving to hold the thermometer in position against section 9. The lower end of block 16 has a V-shaped portion 18 cut out of it so that the bulb 2 of the thermometer is exposed to the atmosphere when the thermometer is placed in the support. To facilitate the circulation of air about the bulb 2 there are a plurality of openings 19 in the lower extremity of block 16 and in the front portion thereof.

When the thermometer of the present invention is placed in the holder, as shown in Figure 3, it is supported therein by its right angled or clinical portion 4 resting in the groove 11 and is held against the vertical section 9 by the block 16. To insert the thermometer in the support the cover or section 14 is swung upward and then closed and locked by the hook 15. While in the support only the long or household portion of the thermometer is exposed. The support with the thermometer therein may be hung on the wall, or wherever convenient, to serve its purpose as a household thermometer and is readily available and easily accessible when it is desired to use the same for clinical purposes.

No shaking down of the mercury or other liquid therein is necessary when the thermometer of the present invention is employed for clinical purposes. Further, the present invention is economical in that it is two thermometers in one.

Figures 5 and 6 show two other suitable supports which may be employed with the present combination thermometer. The holder or support shown in Figure 6 is the same as that shown in Figure 3 with the left half of the crosspiece 10 omitted, as viewed therein.

It should be understood that changes and variations may be made without departing from the spirit and scope of the invention as defined in the appended claims.

I claim:

1. A combination household and clinical thermometer for measuring household and human oral temperatures comprising a straight household portion 9 inches in length having a scale thereon ranging as high as 80 to 90° F. and terminating in a curved section integrally attached to which, at right angles to the household portion, is a straight clinical portion from 1 to 4 inches in length having a scale thereon ranging from about 85 to 95° F. up to about 105 to 108° F., said household portion, curved section and clinical portion having a continuous axial bore therethrough terminating in a bulb attached to the end of the household portion, said bore being of such size that liquid contained therein does not remain fixed upon a decrease in temperature, and said clinical portion being such a distance from the bulb that the indicated human oral temperature thereon may be read by the patient with the combination thermometer in his mouth.

2. A combination household and clinical thermometer for measuring household and human oral temperatures comprising a straight household portion 9 inches in length having a scale thereon ranging from 55 to 90° F. and terminating in a curved section integrally attached to which, at right angles to the household portion, is a straight clinical portion 3 inches in length having a scale thereon ranging from 95 to 105° F., the range between 90 and 950° falling on the curved section, said household portion, curved section and clinical portion having a continuous axial bore therethrough terminating in a bulb attached to the end of the household portion, said bore being of such size that liquid contained therein does not remain fixed upon a decrease in temperature, and said clinical portion being such a distance from the bulb that the indicated human oral temperature thereon may be read by the patient with the combination thermometer in his mouth.

3. A combination household and clinical thermometer for measuring household and human oral temperatures comprising a straight household portion 9 inches in length having a scale thereon ranging from 0 to 85° F. and terminating in a curved section integrally attached to which, at right angles to the household portion, is a straight clinical portion 2 inches in length having a scale thereon ranging from 90 to 105° F., the range between 85 and 90° F. falling on the curved section, said household portion, curved section and clinical portion having a continuous axial bore therethrough terminating in a bulb attached to the end of the household portion, said bore being of such size that liquid contained therein does not remain fixed upon a decrease in temperature, and said clinical portion being such a distance from the bulb that the indicated human oral temperature thereon may be read by the patient with the combination thermometer in his mouth.

4. A combination household and clinical thermometer for measuring household and human oral temperatures comprising, a straight portion terminating in a curved section, a second shorter straight portion integrally attached to the curved section and at an angle between 90° and 135° to the first straight portion, a continuous and axial bore through the first straight portion, curved section and the second straight portion, a fluid bulb integrally attached to the first straight portion, said bore communicating with the bulb, said first straight portion being calibrated to indicate household temperatures, said second shorter straight portion being calibrated to indicate human temperatures, and said second shorter straight portion being such a distance from the bulb that the indicated human oral temperature thereon may be read by the patient with the combination thermometer in his mouth.

5. A thermometer as defined in claim 4 wherein the second shorter straight portion is at an angle between 120° and 135° to the first straight portion.

6. A thermometer as defined in claim 4 wherein the bore is of such size that liquid contained therein does not remain fixed upon a decrease in temperature and wherein the first straight portion is 9 inches in length and the second shorter straight portion is one to 4 inches in length.

7. A combination household and clinical thermometer for measuring household and human oral temperatures comprising, an elongated straight portion integrally attached to one end of which and at right angles thereto is another shorter straight portion, a bulb attached to the other end of the elongated straight portion, said first straight portion being positioned against the face of a rectangular vertical supporting member, a block-like member attached to the face of the supporting member at the lower end thereof, said block-like member having a vertical opening extending therethrough and a V-shaped lower face, the vertex of said V terminating in said vertical opening, a plurality of openings in the outer face of the block-like member communicating with the space formed by the V-shaped lower face, the axes of said openings being perpendicular to the axis of the vertical opening, the lower end of said first straight portion extending through the vertical opening in the block-like member in such manner as to position the bulb in the space formed by the V-shaped lower face, a transverse supporting member attached to the upper end of the vertical supporting member having a groove in one face thereof so positioned as to receive the shorter straight portion when the elongated straight portion is positioned against the face of the rectangular vertical supporting member, thereby supporting the integrally attached portions when the shorter portion is positioned in said groove, and a hinged cover attached to the transverse supporting member for covering the said shorter straight portion while resting in the groove.

8. A combination household and clinical thermometer as defined in claim 7 wherein the elongated straight portion is 9 inches in length and the shorter straight portion is one to 4 inches in length.

GROVER P. BURNS.

References Cited in the file of this patent

UNITED STATES PATENTS

| Number | Name | Date |
|--------|------|------|
| 530,928 | Craw | Dec. 18, 1894 |
| 1,841,908 | Noble | Jan. 19, 1932 |

FOREIGN PATENTS

| Number | Country | Date |
|--------|---------|------|
| 27,500 | Germany | June 16, 1884 |